(12) United States Patent
Shapiro et al.

(10) Patent No.: US 7,051,052 B1
(45) Date of Patent: May 23, 2006

(54) METHOD FOR READING AUDIT DATA FROM A REMOTE MIRRORED DISK FOR APPLICATION TO REMOTE DATABASE BACKUP COPY

(75) Inventors: Patricia Jean Shapiro, Westminster, CA (US); Donald Ralph Hart, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 545 days.

(21) Appl. No.: 10/177,175

(22) Filed: Jun. 20, 2002

(51) Int. Cl.
*G06F 17/00* (2006.01)
*G06F 17/30* (2006.01)

(52) U.S. Cl. .................. 707/204; 707/203; 715/500.1
(58) Field of Classification Search ............... 707/1–4, 707/100–102, 200, 204
See application file for complete search history.

(56) References Cited

U.S. PATENT DOCUMENTS

| 5,404,508 | A | | 4/1995 | Konrad et al. |
| 5,742,792 | A | | 4/1998 | Yanai et al. |
| 5,745,753 | A | | 4/1998 | Mosher |
| 5,884,328 | A | * | 3/1999 | Mosher, Jr. ................. 707/202 |
| 6,633,878 | B1 | * | 10/2003 | Underwood ................ 707/100 |
| 2002/0133507 | A1 | * | 9/2002 | Holenstein et al. ......... 707/200 |

* cited by examiner

*Primary Examiner*—Alford W. Kindred
(74) *Attorney, Agent, or Firm*—Alfred W. Kozak; Mark T. Starr; Lise A. Rode

(57) ABSTRACT

In order to overcome limitations of network connections between a primary host server and a remote secondary host server, the audit file of a primary database is mirrored to an audit file of the remote secondary backup database. A special sensing program called TRACKER operates to speed up the synchronization (duplication) between the primary database and secondary remote database.

1 Claim, 3 Drawing Sheets

(RDB SYSTEM ENVIRONMENT)

METHOD FOR READING AUDIT DATA FROM A REMOTE MIRRORED DISK FOR APPLICATION TO REMOTE DATABASE BACKUP COPY

CROSS-REFERENCES TO RELATED APPLICATIONS

This application is related to co-pending applications listed below, which are incorporated herein by reference:

U.S. Ser. No. 09/415,273 which issued as U.S. Pat. No. 6,430,577 and entitled "System And Method For Asynchronously Receiving Multiple Packets of Audit Data From A Source Databased Host In a Resynchronization Node And Asynchronously Writing The Data To A Target Host".

U.S. Ser. No. 09/415,333 which issued as U.S. Pat. No. 6,446,090 and entitled "Tracker Sensing Method For Regulating Synchronization of Audit Files Between Primary And Secondary Hosts".

U.S. Ser. No. 09/415,274 which issued as U.S. Pat. No. 6,408,310 and entitled "System and Method For Expediting Transfer of Sectioned Audit Files From A Primary Host to a Secondary Host".

U.S. Ser. No. 09/951,996 which issued as U.S. Pat. No. 6,877,016 and entitled "Method Of Capturing A Physically Consistent Mirrored Snapshot Of An Online Database".

FIELD OF THE INVENTION

A method for reading audit data from a remote mirrored disk so that a backup copy is maintained that does not require network use for audit transfer.

BACKGROUND OF THE INVENTION

The present invention relates to a particular system and method for reading audit data from a remote mirrored disk and applying the data to a remote database backup copy. A remote database backup is maintained by (i) transferring a package of audit data from a primary database system to a remote system process; (ii) then writing the audit data to a remote disk; (iii) then applying the audited changes to the remote database backup copy. When a network communication error occurs during the first step (i) involving transferring a package of audit data from a primary database to a remote system process, then, the primary database system activity is temporarily suspended.

This temporary suspension of database activity presents problems and is counter-productive to the goal of maintaining 100% database availability. Thus, in this regard, if a remote database backup could be maintained by reading audit data from a remote mirrored disk, then database availability could be maintained and by not being affected by network communication errors, while at the same time network performance would be improved when the remote mirrored disk is used to off-load network activity.

There are a number of patented prior art technologies which operate in the field of database backup using mirrored disks. These prior art methods can be summarized, as indicated herein below.

The Konrad patent, U.S. Pat. No. 5,404,508 entitled "Database Backup and Recovery System and Method" involves a method for maintaining a backup database. However, while Konrad teaches a limited method to read audit information but only when it is available, Konrad does not teach a method to determine "when" the audit information is available, as is done in the present invention.

The Yanai patent, U.S. Pat. No. 5,742,792 entitled "Remote Data Mirroring" involves two data storage systems interconnected by a datalink for remote mirroring of data. However, while Applicants also uses the concept of "disk mirroring", Applicants function and purpose is quite different, in that the present system of Applicants reads from a remote mirror for the purpose of maintaining a backup database system.

The Mosher, Jr., patent, U.S. Pat. No. 5,745,753 is entitled "Remote Duplicate Database Facility With Database Replication Support For Online DDL Operations". This patent involves a remote data duplication facility which maintains virtual synchronization of the backup database with the local database. The Mosher reference teaches a method of managing method buffers at the source host, including waiting for an acknowledgment from the remote host. However, the advanced method described in the present application eliminates the need for any acknowledgment and the managing of message buffers, thus effectively improving system performance at the source host.

Thus, as previously mentioned, the present invention provides a particular system and method for reading audit data from a remote mirrored disk and applying this data to a remote database backup copy. The present invention allows for the maintenance of a remote database backup which can be provided by reading the audit data from a remote mirrored disk, thus, allowing for the maintainability of the database and not being affected by network communication errors.

SUMMARY OF THE INVENTION

The object of this invention is to realize an increase in database system availability by means of reading audit data from a remote mirrored disk for subsequent availability on a database backup copy.

In order to accomplish this object, an audit transfer option, herein referred to as "Audit File Mirror" (AFM), which consists of a remote database backup option that enables a remote process (referred to as "TRACKER"), to first read audit data from a remote mirrored disk and then apply audited changes to a remote database copy until a logical End-Of-File is encountered and secondly, when a logical End-Of-File is encountered to wait until new audit data is written to the primary database system, after which it will repeat the reading of audit data from the remote mirrored disk and applying the audited changes to a remote database backup copy.

As a result, maximum synchronization (duplication) between a primary database audit file and a secondary database audit file is maintained. At the same time, the primary database availability is increased and system network availability is increased.

A remote database backup copy is maintained for an online "primary" database system by reading audit data that is transferred to a remote location and then applying the changes to the backup "secondary" database.

In order to achieve maximum synchronization or accurate duplication between a primary database audit file and a secondary database audit file, the audit data is transferred via the network connection to the remote location just as soon as it is written to disk at the primary location. This method of audit transfer requires a constant use of a stable network and as a result, the primary database system availability is decreased when a network communication error occurs. However, by reading audit data from the remote mirrored disk, a backup copy is maintained at the remote host that does not require network connection use for audit transfer. Further, the primary database system availability is not affected by any network communication errors.

GLOSSARY OF RELEVANT ITEMS

1. ACCESSROUTINES: The software component of the Unisys DMSII product that is primarily responsible for the accessing (creating, modifying and deleting) of data in a DMSII database. The Accessroutines is also responsible for auditing all changes to the database.

2. ACR: See Accessroutines.

3. ACTIVE TRANSACTIONS COMPLETED: See QUIET POINT.

4. ADMINISTRATIVE OPTIONS: In an RDB (Remote Data Base) system, user-interface options that initiate administrative tasks.

5. APPLICATION DEVELOPMENT: The activity of writing and testing database applications.

6. APPLICATION TRANSACTION STATE: The condition every update program of an audited database must enter in order to perform any data record update statements (e.g., STORE, DELETE, etc.).

7. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL (Data And Structure Development Language) for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).

Figure 1:
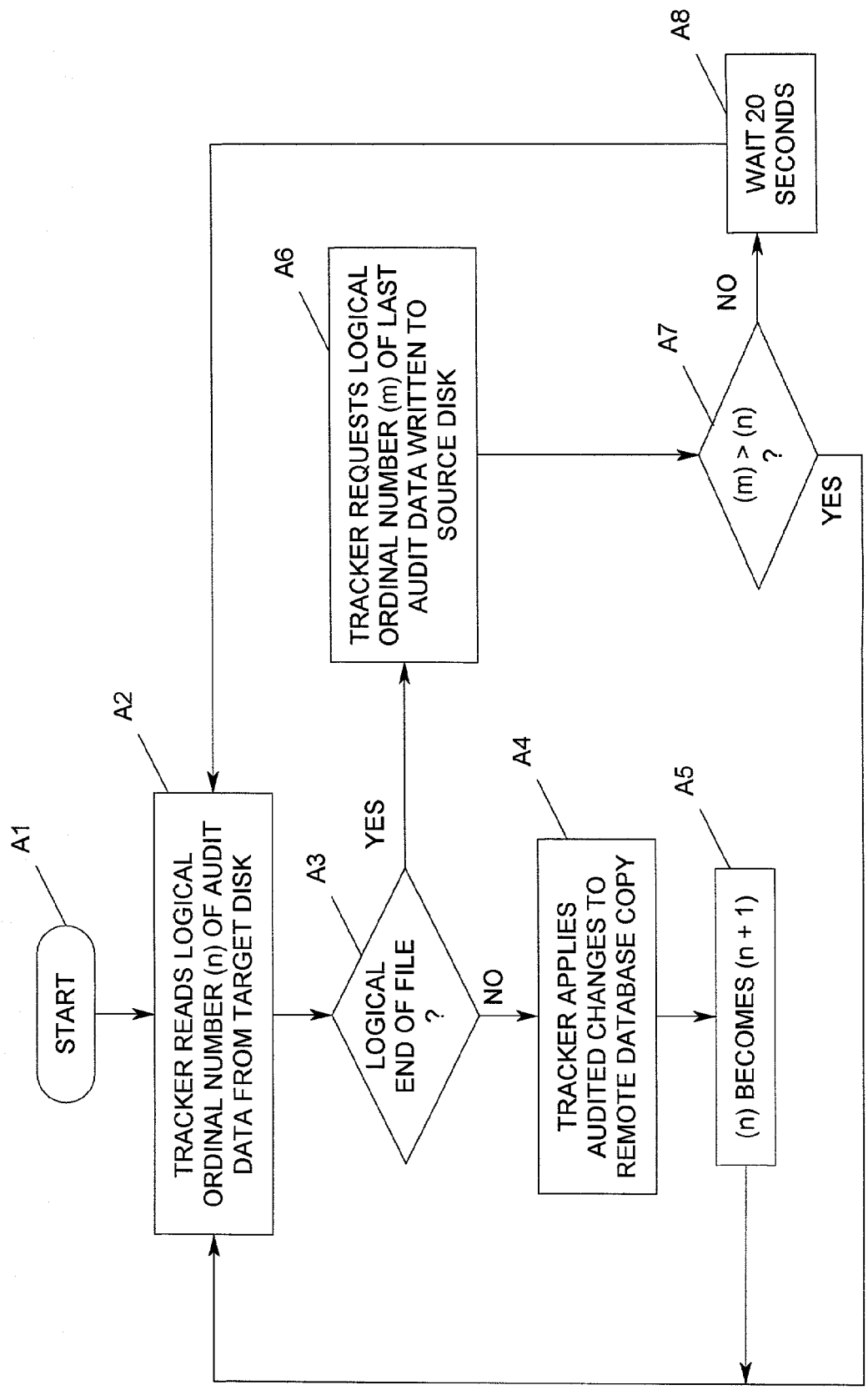
FIG. 1 is a flowchart illustrating the steps utilized by a TRACKER program to apply audited changes to the remote database copy.

8. AUDIT BLOCK SERIAL NUMBER (ABSN): The first word of control information in an audit block, and the last word of control information in an audit block. Each audit block is serially numbered via the audit block serial number in ascending order, representing the order of operations performed on the database. When the maximum value of 268435455 is reached, the value is reset to 1, which is called a "rollover". The audit block serial number is commonly referred to as the audit ABSN. In FIG. 1, (n) refers to the next audit block serial number to be processed by TRACKER at the "secondary host"; (m) refers to the last audit block serial number processed by the database at the "primary" host.

9. AUDIT BUFFER: A system memory buffer maintained by the DMSII software into which an audit block is placed for ACCESSROUTINES access.

10. AUDIT FILE: Logically considered to be the sequential storage of Audit Records. Actually, the sequential storage of Audit Blocks which contain the Audit Records.

11. AUDIT RECORD: A structured package of data built somewhere within the ACR (Access Routine) and stored (sequentially) into the Audit File. Header and trailer words of the record contain, among other things, the length and type of record.

12. AUDIT SECTION: With the Extended Edition, multiple MCP (Master Control Program) disk files can be used to physically implement a single Audit File. Each of these disk files is referred to as a "Section" of the Audit File. The sequence of Audit Blocks is spread, round robin fashion, among the multiple Audit Sections.

13. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN (Audit File Number) value, although they each have a unique section number within their Audit File.

14. AUDIT TRANSFER: In an RDB (Remote Data Base) system, a method of transmitting audit images from the source host to the target host.

15. AUDITED CONTROL POINTS: See CONTROL POINTS.

16. BACKUP: A copy of the primary database files stored on magnetic tape or disk storage. BACKUP aka DATABASE BACKUP aka DATABASE DUMP: This database backup is created as a database dump, which is specially stored and verified copy of database files and associated database system files. A database dump may be a full copy of the database, a subset of the database files, or a selection of files changed since the last backup.

17. BCV: An acronym for Business Continuation Volume. EMC provides the ability to create a duplicate of a disk which can then be processed independently of the original disk. The duplicate is called a Business Continuation Volume (BCV). A BCV contains a mirror image of an active production volume. The BCV can be separated from the production volume, allowing separate tasks to operate on independent data images.

18. BNA NETWORK: The network architecture used on Unisys ClearPath Enterprise Servers to connect multiple, independent, compatible computer systems into a network for distributed processing and resource sharing.

19. CERTIFICATION: The process of verifying the physical consistency of a database or portion of a database.

20. CONFIGURATION OPTIONS: In an RDB (Remote Database Backup) system, user-interface options that initiate configuration tasks.

21. CONTROL POINT: A logical construct within the Unisys e-@ction Enterprise Database Server used to limit the number of audit records which must be reprocessed in the event of a system failure. Data buffers which have been modified are guaranteed to be written to disk at least once every two control points, thus halt/load recovery need only process changes since the second to last control point (FIG. 4) in an audit trail. Control Points occur on a user-specified frequency defined in SYNC points (See Glossary #84).

22. DASDL: Data And Structure Definition Language. The language used to specify the structure and specific software configuration for a database.

23. DATABASE ANALYSIS: The process of analyzing the physical structure of database files.

24. DATABASE AVAILABILITY: The availability of data files within a database system.

25. DATABASE BACKUP COPY: A copy of a database, located at a computer system other than the computer system of the live database, that is available for inquiry and is updated with changes made to the live database through application of the audited changes to the live database. The database backup copy of the live database is not only a physically consistent copy of the database files, it is a functioning copy of the database system, available for inquiry access by application programs. This database backup copy may be used to offload inquiry-only access from the live database, thereby increasing availability of the live database, and is ready to take over live database activity in the event of a failure at the live database system. When the database backup copy is located at a remote location, it is especially useful for takeover of live database activity in the event of a site disaster, providing minimal interruption of business activity.

26. DATABASE CONTROL FILE: A special file required by the DMSII software on all databases. System-level information is stored in the Control File which the ACCESS-ROUTINES use to manage the database. The Control File also provides a place for exclusive users of the database, such as DMUTILITY to mark the database as unavailable.

27. DATABASE EXTRACTIONS: Data that is read from a database.

28. DATABASE INTEGRITY TESTING: The process of testing the physical consistency of data files within a database.

29. DATABASE PROCESSING: Database processing in a mirrored disk environment.

30. DATABUFFER: A system memory buffer maintained by the DMSII software into which a data block is placed for ACCESSROUTINES access.

31. DATA SET: A disk file (potentially, a group of disk files) containing data records all in a similar format. An e-@ction Unisys Enterprise Database Server structure type declared in DASDL (Data And Structure Definition Language).

32. DATA WAREHOUSING: A copy of data specifically structured for querying and reporting.

33. DBA: DataBase Administrator. The person within an organization who is responsible for the development, maintenance, and security of databases.

34. DISASTER RECOVERY: The recovery of any event that had created an inability for an organization to provide critical business functions and data for some predetermined period of time. Generally, this involves reconstituting database files which were lost or unavailable.

35. DISK ROW: The minimum allocation of disk space via the MCP (Master Control Program). A disk file is composed of a sequence of disk rows that may occupy arbitrary locations on the disk media. Within a disk row, all blocks are allocated at sequential disk addresses.

36. DMSII: Unisys Data Management System II. The comprehensive, primary database management software package in use on Unisys A Series family of mainframe computers.

37. DM UTILITY COMMANDS: Commands used to manage a physical database.

38. EMC: A global enterprise storage company.

39. EMC SRDF: See SYMMETRIX REMOTE DATA FACILITY.

40. EMC TIMEFINDER: A business continuance solution which allows customers to use special devices that contain a copy of Symmetrix devices from an attached host(s) while the standard Symmetrix devices are on-line for regular I/O operation from their host(s).

41. FLUSHING TO DISK: The process of writing system memory buffers (data and/or audit) to disk.

42. FUTURE TRANSACTIONS SUSPENDED: The process of preventing database applications from entering a transaction state.

43. HMP: Heterogeneous Multi-Processor.

44. INTEGRATION TEST: The act of combining individual units and components, and then testing them to ensure that the individual units and components still function as expected.

45. LOGICALLY CONSISTENT DATABASE: An online database whose consistency is maintained by data buffers and physical data files.

46. m=: A symbol value which refers to the last Audit Block Serial Number (ABSN) processed by the database at the primary host.

47. MARC: Menu Assisted Resource Control. A menu-based interface to Unisys A Series systems for the purpose of entering system commands.

48. MCP/AS: Unisys Master Control Program/Advanced Systems. The comprehensive virtual memory operating system which drives the Unisys A Series family of hardware.

49. MCP ENTERPRISE SERVER REMOTE DATABASE: In an RDB (Remote Data Backup) system, the database copy that resides at the remote host.

50. MCP TO RDB DATABASE OPERATIONS CENTER GUI: The complete set of Remote Database Backup Operations (Configuration, Administrative, and Monitoring) contained within the Database Operations Center graphical user interface.

51. MIRROR FAMILY: One or more physical disks that share a family name and contain mirrored images of all data from a source family of disks.

52. MIRRORED AUDIT TRANSFER: In an RDB (Remote Data Backup) system, a method of audit transfer where target audit data is available on a mirrored family of disks.

53. MIRRORED COPY: See MIRROR FAMILY.

54. MIRRORED DATA TRANSFER: A method of maintaining a mirrored family of disks containing data files.

55. MIRRORED DISK: A disk which is a mirror image of its source disk (e.g. Family Name, Serial number and capacity are identical).

56. MIRRORED SNAPSHOT: A mirrored copy of data that is split from its source data.

57. MONITORING OPTIONS: In an RDB system, user interface options that initiate the monitoring of audit generation and audit transfer activities.

58. n=: A symbolic value which refers to the "next" Audit Block Serial Number (ABSN) to be processed by the TRACKER program at the remote secondary host.

59. OFFLINE DATABASE SYSTEM: A database system that is in a state of inactivity whereby no data files are being accessed from the database.

60. OFFLOAD PROCESSING: The process of dividing database access activities by creating one or more copies of a database.

61. ONLINE IN DATABASE SYSTEM: A database system that is in a state of activity whereby data files are being accessed from and/or modified to the database.

62. PDS: Product Definition System:. The Unisys internal system containing ordering and configuration information for all Unisys products.

63. PHYSICALLY CONSISTENT DATABASE: A database whose consistency is established when no applications are in a transaction state and all data buffers are flushed to disk.

64. POINT-IN-TIME SNAPSHOT: A mirrored snapshot that is split at a specific point in time.

65. PRIMARY DATABASE: The live database where updates are being made.

66. QUIESCE DATABASE: A database that is in a physically consistent state, i.e., all data buffers are flushed to disk.

67. QUIET POINT: Location in the Audit trail where no program is in transaction state.

68. RDB: Remote Database Backup. A Unisys product which provides real-time backup services for the Unisys DMSII database as part of a disaster recovery plan. Remote Database Backup is suitable for use with A Series Databases.

69. REAL TIME REMOTE DATABASE ACCESS: Access to a remote database copy while the copy is kept current with its source database.

70. REMOTE COPY AUDIT: The activity of backing up a remote audit file that is a copy of its source.

71. SAN: Storage Area Network.

72. SAN MIRROR DISK MANAGER: A ClearPath system software feature that makes it possible to split off a copy of a disk family within the same MCP (Master Control Program) environment as the source volumes, regardless of the type of disk.

73. SCHEDULED BACKUP: A backup that is scheduled to be performed at a predetermined time.

74. SECONDARY DATABASE: The database backup copy where updates are being applied from the audited changes to the primary database.

75. SINGLE HOST BACKUP: A backup that occurs at the same host as its database source.

76. SNAPSHOT COPY: The term "snapshot copy" is used to identify a copy of an MCP (Master Control Program) family which has been provided unique identification. This allows the "snapshot copy" to coexist within the same MCP environment as its original.

77. SOURCE COPY: In a mirrored database environment, the initial database copy that is mirrored onto a target database.

78. SPLIT MIRRORS: Target mirrored disk copies that are split from their original (source).

79. SSR: System Software Release. A package of system software and related documentation that is periodically released to the field for A-Series computer systems.

80. STORE SAFE: A storage software feature that enables a site to ensure that multiple copies (mirrors) of disk data are coherent.

81. STORE SAFE MEMBER: A member of a mirrored set that has been assigned a store safe name.

82. SYMMETRIX: EMC corporation's enterprise storage system.

83. SYMMETRIX I: In an SRDF (Symmetrix Remote Data Facility) environment, the disk storage subsystem that represents the source (primary).

84. SYMMETRIX II: In an SRDF environment, the disk storage subsystem that represents the target (secondary).

85. SYMMETRIX REMOTE DATA FACILITY (SRDF): EMC's disk-mirroring software solution for use with Symmetrix hardware.

86. SYNC POINT: A quiet point (in the audit trail) that is forced to occur every "n" transactions; here Audit buffers are flushed.

87. TRACKER: An asynchronous RDB (Remote Database Backup) task declared and processed from Accessroutines. It's function is to rebuild the database.

88. TRANSACTION: A cycle which starts with a Read or a Write operation and continuing until completion. Thus, Read data is accessed by the Requestor or the Write data is flushed to reside onto the database disk.

89. UCF: User Communication Form. A form used by a Unisys customer to report problems and express comments about Unisys products to support organizations.

90. VDBS: Visible DataBase Stack. A set of commands which are issued directly to a database stack to interrogate or change some aspect of the database configuration.

91. Various Database Functionality:
   a. RDBUTILITY
      (i) RDBUTILITY is a menu-driven user interface for defining, installing, and maintaining a Remote Database Backup system.
      (ii) RDBUTILITY is used to configure the operations of the database within each Remote Database Backup system. RDBUTILITY also reports the status of audit transmissions under the ABW audit transmission mode and provides database and network cumulative statistics about audit transmissions.
   b. DBCENTER
      (i) DBCENTER is a graphical user interface for defining, installing, and maintaining a Remote Database Backup system.

(ii) DBCENTER is used to configure the operations of the database within each Remote Database Backup system. DBCENTER also reports the status of audit transmissions under the ABW audit transmission mode and provides database and network cumulative statistics about audit transmissions.

c. RDB Control File (i) The RDB Control file is a file that is created by the primary host database system during the initial configuration of an RDB system.

(ii) The RDB Control file contains information that controls both database and Remote Database Backup system behavior at the primary and secondary hosts.

d. RDB Agent (i) RDB Agent is an asynchronous task processed from the RDB support library.

(ii) The function of RDB Agent is to periodically initiate interhost communication to periodically monitor remote database system behavior.

The above designated functions are described in a Unisys Corp. document identified as—Unisys e-@ction<mailto:e-@ction>ClearPath Enterprise Servers Remote Database Backup Planning and Operations Guide (8600 2052-305) MCP Release 7.0 November, 2001

Notes:

EMC=Trademark TM of EMC Corp.

Symmetrix is a copyright of EMC.

SRDF=TM of EMC.

ClearPath=TM of Unisys.

Windows NT—Copyright of Microsoft.

DESCRIPTION OF PREFERRED EMBODIMENT

The present system will be seen as a database system with additional capabilities. This database system includes the ability to perform in a multi-processing environment with on-line access and update, the support of maintenance activities such as database backup, the support for database failure or logical database recovery, the support for creating a physically consistent snapshot of the database in cooperation with a mirrored disk environment, and the support of a remote database backup system at another computer system for database disaster recovery.

The presently described system describes changes to the remote database system which will utilize a mirrored disk environment for storage of the audited changes to the on-line database system, which will be available for use at the secondary computer system to be applied to the remote database backup copy without interruption or delay from a network transfer of the audited changes. This operation is designated as the Audit File Mirror (AFM) mode.

Figure 2:
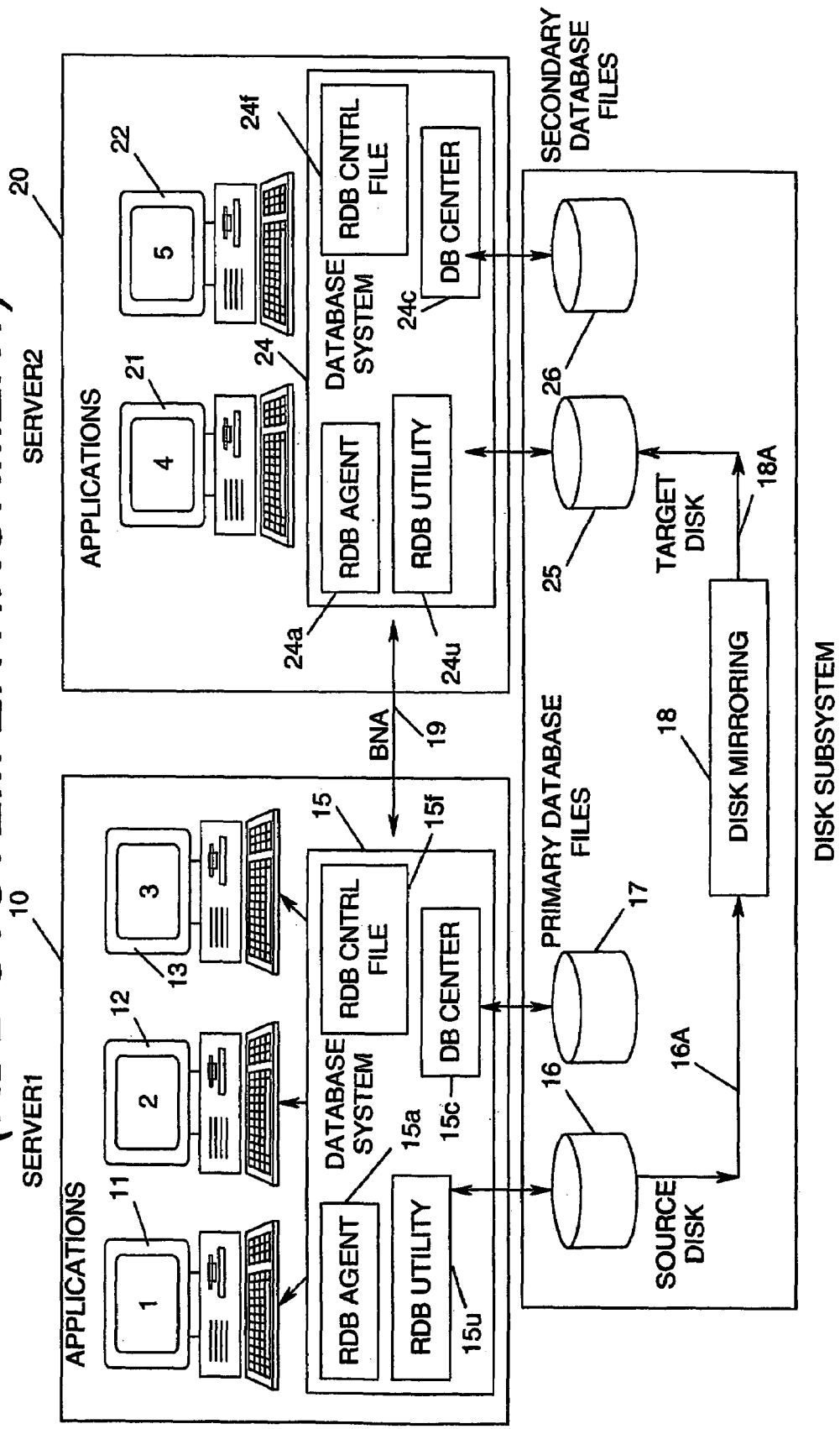
FIG. 2 is a drawing of the system showing a local host-server and remote host-server interconnected with a disk-mirroring apparatus.

FIG. 2 is a diagram of the Remote Database Backup (RDB) system environment. The main server 10 is used to run several different applications, as shown by the personal computer client-users 11, 12, and 13, which interact with and access the database 15.

The secondary server 20 contains applications available to a secondary client-user and a secondary database system 24 which is constantly being updated with the audited changes made to the primary database 17. The audit files on disk 16 (source disk) are mirrored to the disk 25 target disk (via disk mirroring system 18) where a TRACKER program reads the audited changes from the target disk 25 and then updates the database copy 26.

As seen in FIG. 2, the primary Database System 15 is seen to include four elements: RDB Agent 15a, RDB Utility 15u, Database Center 15c and the RDB Control File 15f. Similarly, the secondary Database System 24 holds co-relating elements 24a, 24u, 24c and 24f.

The Remote Database (RDB) Agent 15a, 24a will periodically initiate inter-host communications to periodically monitor the remote system behavior. The RDB Utility 15u, 24u, operates to configure operations of the database within each Remote Database Backup System in addition to reporting status of audit transmissions during the Audit Block Write (ABW) transmission mode. This utility also provides database and network statistics about audit transmissions.

The Database Center 15c, 24c is a graphical user interface for defining, installing and maintaining a Remote Database Backup System. This Center configures operations of its database, reports status of audit transmissions and provides database and network statistics.

The RDB Control File 15f, 24f is a file created by the host database during initial configuration of an RDB system. It holds information to control both the database and backup system behavior of the host and allows selection of a chosen mode of audit transfer.

The RDB Utility and the Database Center provide the ability to inform the primary and secondary database (15,24) that a mirrored disk system 18 is being used to provide changes to the secondary host database 24, for application of the TRACKER program.

Both the primary and secondary database systems have one means 19 of communicating with each other. They can communicate via a network channel BNA 19 shown in FIG. 2.

Operationally, the system of FIG. 2 enables users in applications 11, 12, and 13 to operate with the database system 15 such that the disk volume 16 will accumulate audit file data which is sent through the disk mirroring system 18 to the secondary host target disk 25.

In the primary server system, the disk 17 carries accumulated data which is available to the primary client-users and applications on modules 11, 12 and 13.

In the secondary or remote server host, the audit data accumulated on disk volumes 25 is read by a TRACKER program through the secondary database system 24 where this audit data is used to update the existing file of data in secondary backup copy disk 26 for availability to secondary client-user applications 21 and 22.

The disk mirroring system 18 of FIG. 2 could, for example, be a product of the EMC Corporation of Hopkinton, Mass., as represented in the U.S. Pat. No. 5,742,792 to Moshe Yanai, et al. Thus, two data storage systems are interconnected by a data link for remote mirroring of data.

In the present embodiment utilized herein, each volume of local primary data is configured as local audit data on disk 16 and local database information on disk 17. The source audit data on disk 16 is connected via the disk mirroring system 18 to a secondary target disk volume 25.

In normal operation, the primary host server 10 directly accesses a local disk volume 17, and audit file data written in the primary disk volume 16 is automatically sent over the mirror link 18 to a corresponding secondary target disk volume 25. Thus, in FIG. 2, the data residing on disk volume 16 is immediately duplicated on to disk volume 25. After operation of the TRACKER program task shown in FIG. 3, then the secondary disk volume 26 can operate as a "remote database backup copy" which has been updated with audited changes on target disk 25.

Due to the utilization of the disk mirroring system 18, there is no longer any dependency on the network connection 19, for the transfer of audit change data, via FIG. 2 BNA-19 which may be interrupted, fail, or transmit spurious signals during transfer of audit data.

Figure 3:
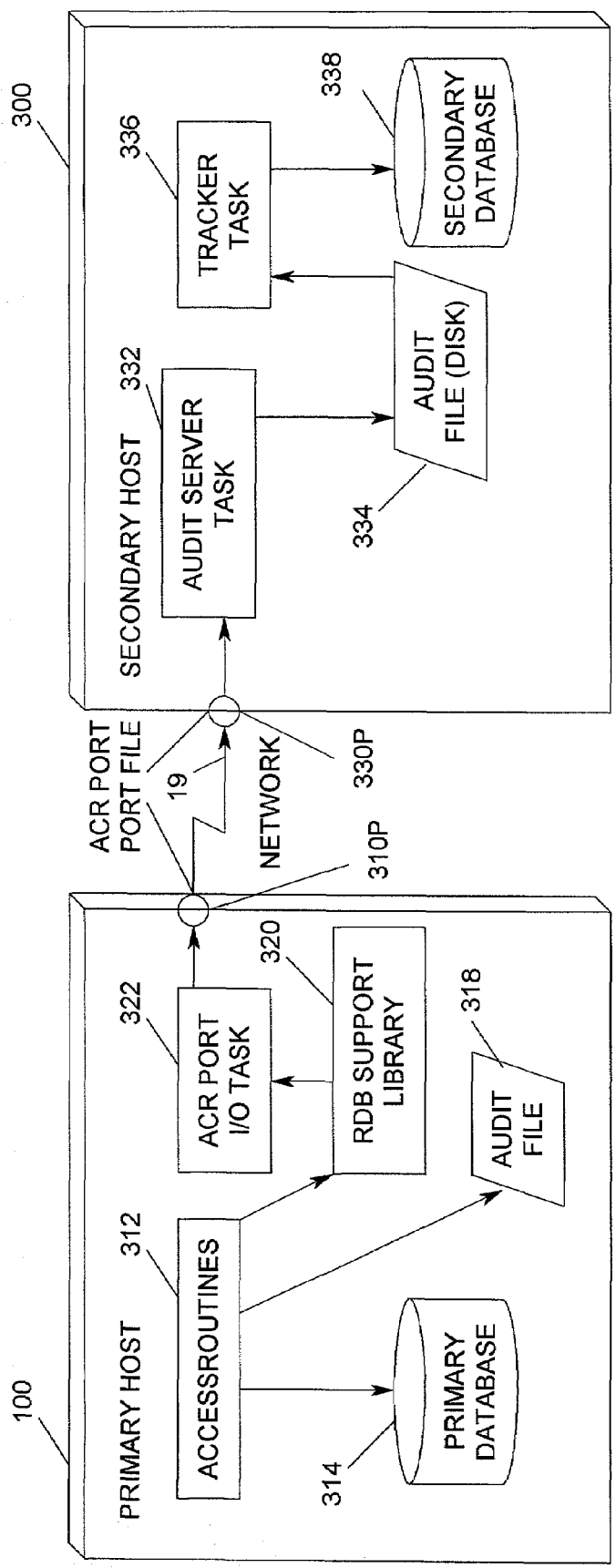
FIG. 3 is a drawing illustrating the use of the TRACKER program between the local primary host and remote secondary host.

FIG. 3 is a drawing illustrating the use of the TRACKER program mechanism for operation and backup between a primary host and a secondary host. This TRACKER system has been described in the co-pending U.S. Ser. No. 09/415,333. This mechanism utilizes audit files in holding multiple records called "audit blocks".

The TRACKER is a specialized program operating to sense the number of audit blocks received by a secondary host and to contrast this with the number of audit blocks residing in the primary host which are yet to be transferred to the secondary host. When a certain pre-set critical value of the contrast between the two sets of audit block files is reached, then the TRACKER program will institute a speed-up process to expedite the transfer of audit blocks from the primary host to the secondary host, until a more desirable level of parity and duplication occurs between the database files of the primary host and the secondary host. This TRACKER program was described in the cited U.S. Pat. No. 6,446,090.

The present system uses an "End-Of-File" sensing operation involving an attribute which controls the important trade-off in database performance. The use of small values for the updated End-Of-File (EOF) will reduce the number of disk read operations needed to locate the end of the audit trail during recovery. There is an End-Of-File pointer in block 0 of the audit file block which is used during normal operation of the database.

The TRACKER program methodology shown in FIG. 3 and flow-charted in FIG. 1, will use audit block write (ABW) serial numbers (ABSN) which have been placed to identify each audit block in the primary host which is waiting to be transferred. These audit block serial numbers can be compared with the highest audit block serial number of the audit block received at the secondary host. Thus, there can be a calculation of the disparity as to how much lack of duplication (synchronization) is occurring as between the secondary host in duplicating the primary host audit files. This amount of disparity can be regulated or set to a certain level so that when a certain level of disparity occurs, then the TRACKER program will initiate another program which will speed up the transfer process, but only if there is a sufficient lack of disparity, as between the audit block files of the secondary host in relationship to the audit block files placed in the primary host.

FIG. 3 is a drawing showing how the remote database (RDB) components work together using the ABW mode. A primary host 100 is seen connected to the secondary host 300 via the network 19. When the user opens up the primary database 314, the RDB Support Library 320 is invoked via the Accessroutines program 312. The RDB Support Library 320 in turn initiates the audit server 332 on the secondary host 300 via the Accessroutines Port I/O Task module 322.

The ACR-PORT I/O Task module 322 then takes the audit images from the primary database 314 on the primary host 10 and transfers these images to the audit server 32 on the secondary host 30.

Under the ABW audit transmission mode, the audit server 332 then writes the images to the secondary base audit file 334. The audit server 332, with the RDB support program and an associated Catch-up program (as described in U.S. Pat. No. 6,446,090), then maintains a synchronization of the two audit trails.

The TRACKER task program 336 on the secondary host 300 maintains synchronization of the two databases (primary database 314 and secondary database 338) by applying the audit images from the audit file trail 334 to the secondary database 338. The TRACKER program and the elements of secondary host 300 (FIG. 3) are located in the Database System 24 of FIG. 2.

Sectioned Audit Files: On the primary host 310 of FIG. 3, the ACR port I/O task 322 is responsible for sending audit blocks to the secondary host through a dedicated sub-port 310p of the ACR port. On the secondary host 300, the audit server task 332 receives audit blocks and writes them to the appropriate audit section. A database schema defines a "section", as well as all other physical database attributes.

The system of FIG. 3 generates one ACR port I/O Task 322 and one audit server task 332 for each audit "section". These tasks are always present on both the primary and secondary hosts to provide swift response in the event of a takeover, i.e., that is, switching the job function of the primary host to that of the secondary host.

TRACKER: The TRACKER 336, FIG. 3, in the secondary host 300 is an asynchronous remote database (RDB) task program which is declared and processed from the database stack in the primary database 314.

The TRACKER program is initiated when (i) the database is opened at either the primary or the secondary hosts; (ii) audit images are received at the primary host; (iii) audit images are received at the secondary host; (iv) the RDB-agent detects that a Catch-up process is necessary; (v) an RDB utility acknowledgment is performed.

TRACKER Operations: The TRACKER 336 of FIG. 3 in the remote secondary host 300 performs a certain number of operations, as follows:

(a) On the secondary host 300, the TRACKER 336 reads the audit images from the audit file trail 334 and applies these images directly to the secondary database 338 through a mechanism similar to a rebuild recovery mechanism.

The reading and applying of audit images occurs in two separate phases. During the first phase known as pre-scanning, TRACKER 336 reads the audit file while looking for a point at which no transactions are in progress. Such a point is known as a "quiet point".

During the second phase, the TRACKER program begins to apply all audit images from its current position in the audit trail to the quiet point found during the pre-scanning phase. In other words, TRACKER applies audit images from transactions to the secondary database.

(b) On the primary host 100, the TRACKER 336 is always initiated by the first database opener. In most cases, TRACKER quickly goes to the end of task (EOT) condition. If a halt/load recovery is needed, however, TRACKER waits for the DM RECOVERY task to complete, and then applies any audit after-images required by the recovery before going to the end-of-task (EOT). DM RECOVERY task is the task that performs database recovery in order to re-establish the logical and physical consistency of a database.

(c) Under the ABW audit transmission mode, the TRACKER program 336 initiates a Catch-up task as soon as it reads to the end of the audit trail at the secondary host, and when it detects that the primary and secondary audit trails are not synchronized. The Audit Block Serial Numbers (ABSN) are used to determine whether the primary and secondary files are out of synchronization. These numbers are logically assigned in a round-robin fashion to audit blocks in each section before they are transmitted by the source host. The RDB Support Library 320 in each host will maintain a list of the ABSN values that are globally accessible by any processes that are involved in the transmission of audit blocks between the two hosts. The TRACKER 336 on the secondary host 300 communicates with the server 100 on the primary host in order to keep track of the ABSN values that have been transmitted. As soon as an out-of-synchronization condition is detected, the TRACKER is able to determine the ABSN number of the audit block from which re-transmission has to start by accessing the last successfully received ABSM value from the RDB Support Library 320.

TRACKER and Inquiry Programs: The TRACKER and Inquiry programs will work together. Because of database integrity constraints, the TRACKER program must have exclusive use of either database when it is applying audit images. Consequently, when TRACKER 336 is applying audit images, the inquiry programs are "locked-out" of the database. Conversely, when inquiry programs are accessing the database, then the TRACKER program is not able to apply audit images.

"Lock-out Time" is the time that users are unable to read data from a database because TRACKER 336 may be in the process of changing the database. Thus, Inquiry programs and TRACKER programs lock-out each other from the database only during the time that TRACKER applies audit images. The length of the lock-out time is dependent upon the contents of the audit trail; the time also varies by the site of the database. TRACKER program 336 does not lock-out Inquiry programs while the TRACKER is merely pre-scanning the audit trail.

If the TRACKER task program 336 does not terminate normally, it then locks-out all Inquiry programs when it resumes applying audits to the database, until it comes to a point where the database is in a consistent state. At that point, the TRACKER program 336 again allows inquiries while it is pre-scanning audits.

Each time the TRACKER program comes up into operation, the Inquiry programs are locked-out until TRACKER can ensure the integrity of the secondary database.

It can be observed by comparing FIG. 3 to FIG. 2, that there is no longer any dependency on the network 19 and the network ports 310*p* and 330*p*, which is seen in FIG. 3, since as will be noticed in FIG. 2, the remote mirroring facility 18 keeps a continuous connection which is independent of the network connection 19 of FIG. 3. Thus, the system of FIG. 2 is independent of any network delays, breakdowns, or spurious transmission that might be occurring because of the network connection 19.

FIG. 1 is a flow chart illustrating the TRACKER process, as applied to the remote mirroring facility at the secondary host server. This figure describes the events that will occur on the secondary server side when the Audit File Mirror (AFM) is selected.

The process starts at step A1. The next step, A2 occurs when the TRACKER program begins to read audit data from the target disk 25 of FIG. 2. While TRACKER is reading the audit data, the TRACKER program will check if an "End-Of-File" has occurred, as seen at step A3, of FIG. 1.

If there has not been a logical End-Of-File (NO), then the process proceeds to step A4, where the TRACKER program (at the remote secondary host) then applies all of the changes onto the remote database copy 26.

At step A3, if a logical End-Of-File has occurred (YES), then the process will move to step A6 where the TRACKER program will query the primary database system 15 (FIG. 2) and request audit data to be read. This then leads the process to the decision diamond, step A7. Here, if there is more audit data to read, then the process will proceed back to step A2 and re-start itself.

At step A7, the decision block queries whether (m) is greater than (n)? Here, "m" is the number of the last audit block which was written on the source disk 16 but not yet (available to be read from target disk 25). Since, the audit information is residing in audit blocks, and each audit block has an audit block serial number (ABSN), this situation is sensed by the TRACKER program at the secondary host. Here, the TRACKER can sense (n) which refers to the next audit block serial number to be processed by TRACKER at the secondary host. TRACKER also senses (m), which refers to the last audit block serial number processed by the database at disk 16 of the primary host 10. Thus, at step 7, the decision block is querying whether the last audit block serial number "m" residing on disk 16 at the primary host 10 is greater than the next waiting audit block serial number to be processed at the secondary host. If (m) is greater than (n), then the "YES" leg returns back to step A2, where the TRACKER program will read the logical number (n) of the audit data from the target disk 25. It should be understood that disk 16 and disk 25 are mirrors of each other through the disk mirroring system 18. However, at step A7, if no audit data is available to read (NO), (m is not greater than n) then the program will proceed to step A8, where the TRACKER program will wait 20 seconds before restarting the process back at step A2, where TRACKER reads the number (n) of audit data represented by the ABSN (n) from target disk 25.

Now, again at step A7, if (m) (the last audit block serial number processed by the primary host) is not greater than (n), that is to say, n is equal to or greater than (m), this means that the last audit block serial number processed by the database at the primary host has a value less than the next audit block serial number to be processed by TRACKER at the secondary host. There is then a 20 second wait at step A8, which then returns the sequence back to step A2. This then gives the system a chance to check if the newly-created audit files on disk 16 should be read from disk 25.

Then, the sequence goes through step A3, and so long as there is no logical End-Of-File, then the TRACKER program applies the audited changes to the target remote database copy 26 at step A4, then at step A5, the "n", which is the next audit block serial number to be processed by TRACKER at the secondary host, is incremented by "1", that is to say, the number of the audit block serial number is incremented by "1", after which there is a return to step A2, and this condition continues with the incrementation of "n" until at step A3, the logical End-Of-File is reached.

Then, when the logical End-Of-File is reached at step A3, step A6 causes the TRACKER to request the number "n" of the last audit data written to the source disk 25. This process continues until TRACKER senses End of Audit Trail.

At step A2 of FIG. 1, the TRACKER reads the logical ordinal number (n) of audit data from the target disk.

At step A6, the TRACKER requests the logical ordinal number (m) of the last audit data written to the source disk 16. TRACKER is part of the remote secondary database system 24.

TRACKER continues in the read audit, apply audit loop until physical end of the audit file AND logical end of the audit trail or until TRACKER is at a quiet point in the audit trail and has a reason to exit.

Described herein is a system and method for increasing data system availability by means of reading audit data from a remote mirrored disk for placement onto a stable secondary database. This is accomplished by a special method of audit data transfer which involves a "Audit File Mirror" (AFM). The Audit File Mirror consists of a remote database backup system that enables a specialized remote processor in the secondary server, and referred to as "TRACKER" to operate so as to first read the audit data from a remote mirrored disk, and then apply these audited changes to a remote database copy until a logical End-Of-File is encountered. When a logical End-Of-File is encountered, the system will wait until new audit data is written to the primary database system, which primary database system is connected through a mirroring system to a secondary database, which replicates the audit data from the primary database. Then, the TRACKER program will repeat the reading of audit data from the remote mirrored disk and place it onto a stable database disk volume so that the secondary host will have a stable secondary backup available which replicates the information which is on the primary database.

While normal information transfer can occur over a network line between the primary and secondary hosts, there is the problem which can arise when a network is down or interrupted or filled with errors so that the line of communication between the primary and secondary is not available to permit an update and replication of the secondary host with the primary host.

However, with the use of the disk mirroring system, whereby a primary disk volume is immediately replicated at the secondary disk volume, and then the secondary disk volume is handled by the present secondary host TRACKER program so that the audit data, which has been mirrored, can then be placed on a stationery disk volume as a remote database backup copy (26) in the second host server system.

As a result, there is continuous communication and replication as between the primary host and the secondary host, and the secondary host continuously operates to make sure that any audit data in the primary host will be noted and presented for application to the secondary database by means of the TRACKER program at the secondary server and database.

While a preferred embodiment of the system and method for database backup has been illustrated, it should be understood that other variations and applications may be embodied while still defined within the scope of the attached claims.

What is claimed is:

1. A method for achieving database:
   synchronization between a primary host database system means and a replicated secondary host database system means, which holds a secondary disk volume (25) which is transferred to a secondary backup disk volume (26) which becomes available for data access, said method comprising the steps of:
   (a) maintaining a synchronized copy of said primary host database system means (15) at said secondary host database system means (24) so that a primary disk volume (16) of audit files is mirrored at a secondary disk volume (25) of secondary audit files at said secondary host database system means (24);
   (b) sensing said secondary audit files at said secondary disk volume (25) with a TRACKER program which reads the audit file data blocks from said secondary disk volume (25) as soon as said audit file data blocks are written to said primary disk volume (16);
   (c) transferring files from said secondary disk volume (25) to said secondary backup disk volume (26) via said TRACKER program rendering said secondary host database system means (24) immediately available for data access.

* * * * *